(No Model.)
J. R. LYNN & E. R. PALLEN.
AUTOMATIC DEVICE FOR ADVERTISING PURPOSES.
No. 537,468. Patented Apr. 16, 1895.
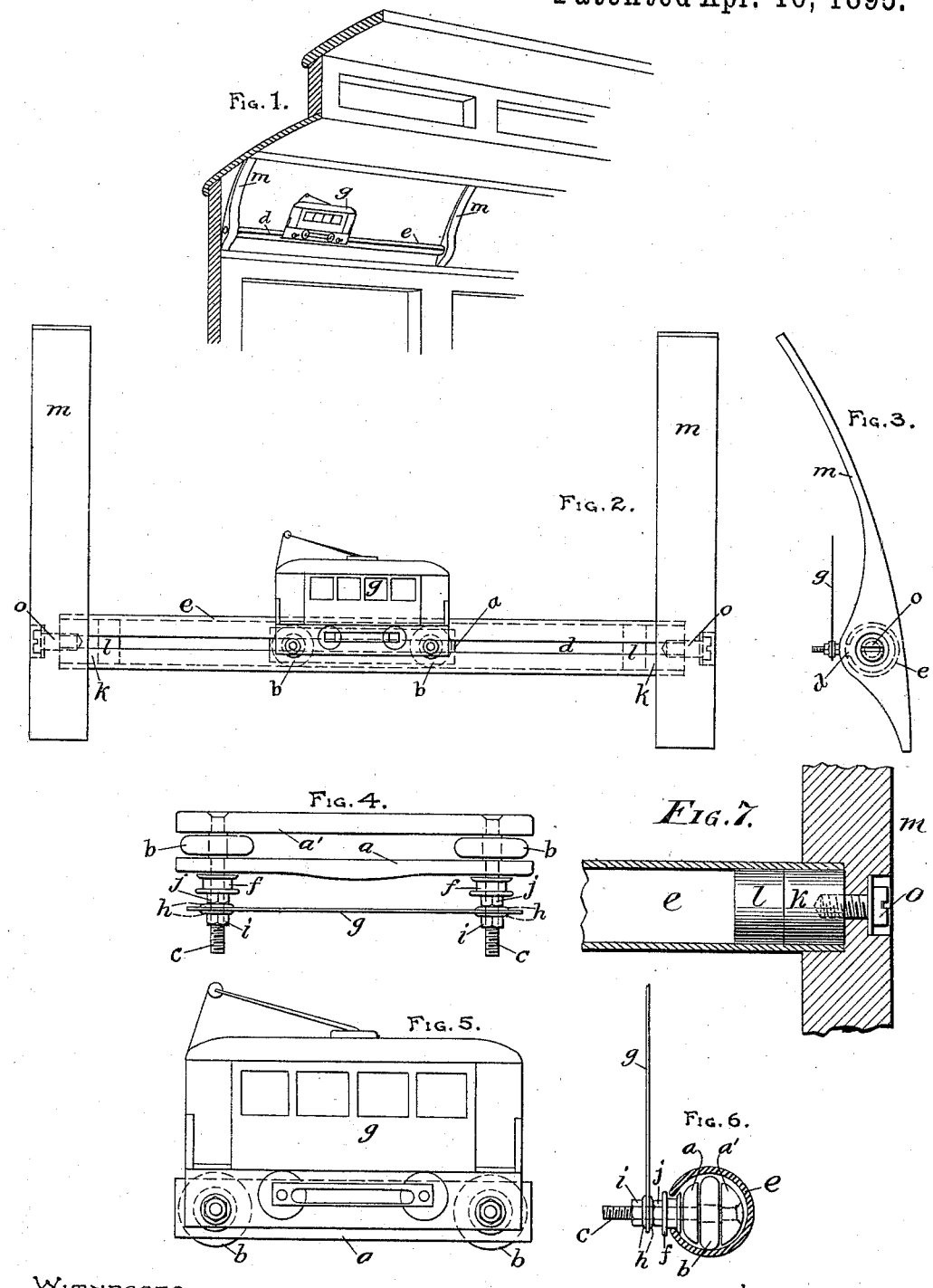
WITNESSES.
Wm. L. Pallens
Arthur A. Muth
INVENTORS.
John R. Lynn
Edward R. Pallen

UNITED STATES PATENT OFFICE.

JOHN R. LYNN AND EDWARD R. PALLEN, OF PHILADELPHIA, PENNSYLVANIA, ASSIGNORS TO THE RAILWAY AUTOMATIC ADVERTISING COMPANY, OF NEW JERSEY.

AUTOMATIC DEVICE FOR ADVERTISING PURPOSES.

SPECIFICATION forming part of Letters Patent No. 537,468, dated April 16, 1895.

Application filed August 30, 1894. Serial No. 521,730. (No model.)

*To all whom it may concern:*

Be it known that we, JOHN R. LYNN and EDWARD R. PALLEN, citizens of the United States, residing in the city and county of Philadelphia, State of Pennsylvania, have invented a new and useful Automatic Device to be Used for Advertising Purposes, which is fully set forth in the following specification and accompanying drawings.

Our invention relates to an automatic device to be used for advertising purposes on street or railway cars or any vehicle that will, by reason of its motion, acceleration or retarding of speed, give impetus to operate said device, and consists of a movable object or objects attached to a carrier which moves in response to the impetus, imparted by the motion of the vehicle to which said device is attached.

It further consists of the combination of parts hereinafter set forth.

Figure 1 represents a perspective view of the device with object attached shown as used in a car. Fig. 2 shows general view of device. Fig. 3 shows an end view of device. Fig. 4 shows a plan view of carrier showing object attached; Fig. 5, a side elevation of carrier showing object attached; Fig. 6, an end view of carrier showing object attached and position of carrier in tube. Fig. 7 shows a sectional view of end of tube and bracket showing mode of securing same to bracket.

Similar letters refer to similar parts throughout the several views.

The carrier (a' a Fig. 4) is supported by wheels (B). From the carrier (a' a) project connecting pins (c) which may also serve as the axle for wheels (B) and which extend through the slot (D Fig. 2) and to which is attached the object (G.) by means of washers (H) and nut (I. Fig. 4) or any other suitable means.

The carrier wheels (B. Fig. 2) rest upon the inner surface of a slotted tube (E). The inside diameter of said tube (E.) is slightly greater than the diameter of the carrier wheel (B). To reduce friction, the connecting pins (c. Fig. 4) are supplied with a small wheel (F) flanged or plain which is of slightly smaller diameter than the width of the slot (D. Fig. 2) through which it travels and said slot wheel is adjusted by means of nut (J. Fig. 4). The tube (E. Fig. 2) is provided with end pieces K to which it is secured for the purpose of attaching brackets (M) by means of screw (O) substantially as shown. The tube (E Fig. 2) is also provided with additional end pieces (L) of rubber or soft material to prevent injury to carrier (A).

Having thus described our invention, what we claim, and desire to secure by Letters Patent, is—

1. In an automatic device for advertising a carrier consisting of two semicircular pieces a a' secured from each other on the pins c sufficiently to allow the carrier wheels to revolve, pins projecting from the carrier piece a for the purpose of supporting a detachable sign object G in combination with a slotted tubular track e provided with end pieces K securely fastened to said track and brackets M provided with bores for the reception of the ends of said tubular track; said brackets being secured to the end of said tubular track by the screw O said parts being combined substantially as described and for the purpose set forth.

2. In an automatic device for advertising the combination with a detachable object, of a carrier consisting of two semicircular pieces secured from each other on the pins c sufficiently to allow the carrier wheels to revolve and pins projecting and connecting with said object, a horizontal slotted tubular track for the reception of carrier, said tubular track being provided with end pieces securely fastened thereto and brackets provided with bores to receive the ends of said tubular track, the brackets being secured to the end of said tubular track by means of screw o substantially as shown and for the purpose set forth.

JOHN R. LYNN.
EDWARD R. PALLEN.

Witnesses:
JOSEPH PALLEN,
ARTHUR A. MUTH.